United States Patent
Mai (10) Patent No.: US 10,520,767 B2
(45) Date of Patent: Dec. 31, 2019

(54) POLARIZER AND LCD DEVICE USING SAME

(71) Applicant: Century Technology (Shenzhen) Corporation Limited, Shenzhen (CN)

(72) Inventor: Chen-Fu Mai, New Taipei (TW)

(73) Assignee: Century Technology (Shenzhen) Corporation Limited, Shenzhen (CN)

(*) Notice: Subject to any disclaimer, the term of this patent is extended or adjusted under 35 U.S.C. 154(b) by 0 days.

(21) Appl. No.: 16/019,696

(22) Filed: Jun. 27, 2018

(65) Prior Publication Data

US 2019/0196264 A1    Jun. 27, 2019

(30) Foreign Application Priority Data

Dec. 22, 2017 (CN) .......................... 2017 1 1401913

(51) Int. Cl.
*G02F 1/1335* (2006.01)
*G02B 5/30* (2006.01)

(52) U.S. Cl.
CPC ..... *G02F 1/133528* (2013.01); *G02B 5/3025* (2013.01)

(58) Field of Classification Search
CPC ......... G02F 1/133528; G02F 1/133514; G02F 1/133512; G02B 5/3025
USPC ....................................... 349/96–98
See application file for complete search history.

(56) References Cited

U.S. PATENT DOCUMENTS 6,175,398 B1 * 1/2001 Yamada ............... G02B 5/3016
349/165
2010/0060985 A1 * 3/2010 Kamada ............ B32B 17/10036
359/487.06

FOREIGN PATENT DOCUMENTS

EP    2161123 A1    3/2010

* cited by examiner

*Primary Examiner* — Charles S Chang
(74) *Attorney, Agent, or Firm* — ScienBiziP, P.C.

(57) ABSTRACT

A polarizer includes a first polarizing layer. The polarizing layer is configured for polarizing light. The first polarizing layer has a first absorption axis. The first absorption axis is a curved line.

10 Claims, 9 Drawing Sheets

POLARIZER AND LCD DEVICE USING SAME

FIELD

The subject matter herein generally relates to a polarizer and a liquid crystal display (LCD) device using the polarizer.

BACKGROUND

Polarizers are optical devices configured for polarizing natural light or arbitrarily polarized light in a direction, and are widely used in display devices, such as liquid crystal displays (LCDs) or organic light emitting diode (OLED) displays. Currently, polyvinyl alcohol-based polarizing films, containing an iodine-based compound or a dichroic dye and having a molecular structure in which molecular chains are oriented in a direction, are generally used as polarizers for display devices. Polyvinyl alcohol-based polarizing films are manufactured by dyeing a polyvinyl, alcohol-based film with iodine or a dichroic dye, stretching the polyvinyl alcohol-based film in a direction, and performing a cross-linking process thereon.

Accordingly, there is room for improvement in the art.

BRIEF DESCRIPTION OF THE DRAWINGS

Implementations of the technology will now be described with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the disclosure.

The term "coupled" is defined as connected, whether directly or indirectly through intervening components, and is not necessarily limited to physical connections. The connection can be such that the objects are permanently connected or releasably connected. The term "comprising" when utilized, means "including, but not necessarily limited to"; it specifically indicates open-ended inclusion or membership in the so-described combination, group, series, and the like.

The polarizer in the disclosure can be used in various liquid crystal display (LCD) devices, such as transverse electric field type LCD devices including In-Plane Switching (IPS) type LCD device and Fringe Field Switching (FFS) type LCD device, or longitudinal electric field type LCD devices including twisted nematic (TN) LCD device and multi-domain vertical alignment (MVA). The polarizer can be used as an upper polarizer or a lower polarizer of the LCD device. Such a polarizer is an optical filter that only lets light waves of a specific polarization pass through while not letting light waves of other polarization angles pass through.

The polarizer in the disclosure comprises one or more polarizing layers, each having a curved absorption axis.

First Embodiment

Figure 1:
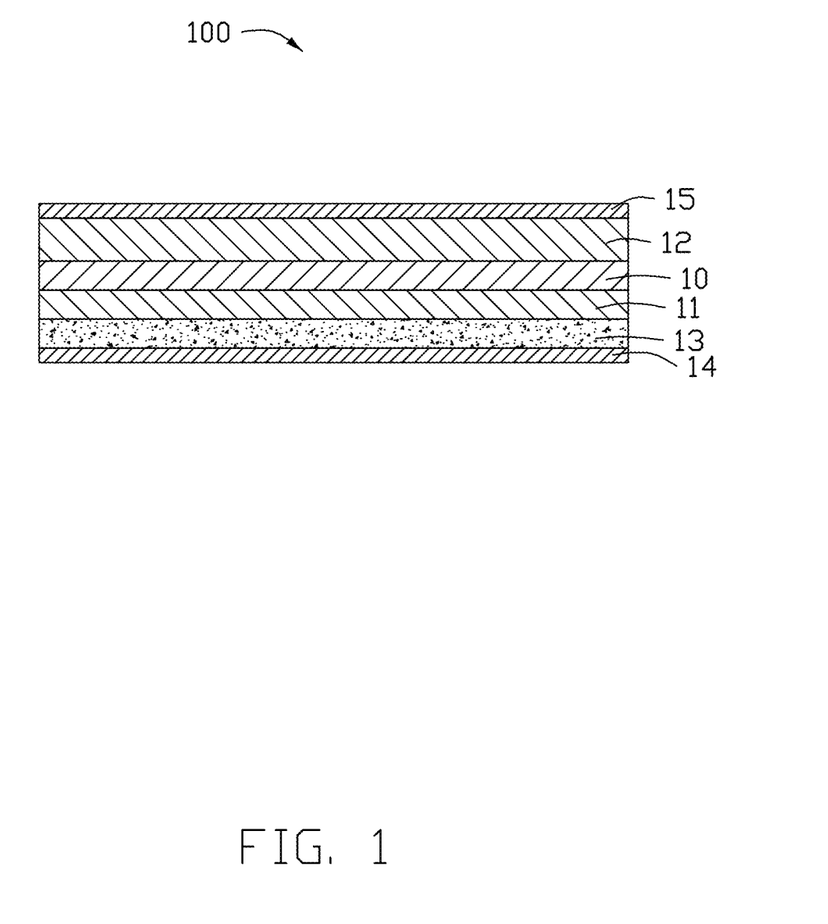
FIG. 1 is a cross-sectional view of an embodiment of a polarizer.

FIG. 1 illustrates a polarizer 100 according to a first embodiment. The polarizer 100 includes a polarizing layer 10, a first protecting layer 11 on a first side of the polarizing layer 10, and a second protecting layer 12 on a second side of the polarizing layer 10, wherein the first side of the polarizing layer 10 is opposite to the second side of the polarizing layer 10. The polarizer 100 further includes an adhesive layer 13 on a side of the first protecting layer 11 away from the side contacting the polarizing layer 10, a release film 14 on a side of the adhesive layer 13 away from the polarizing layer 10, and a protective layer 15 on a side of the second protecting layer 12 away from the polarizing layer 10.

Figure 2:
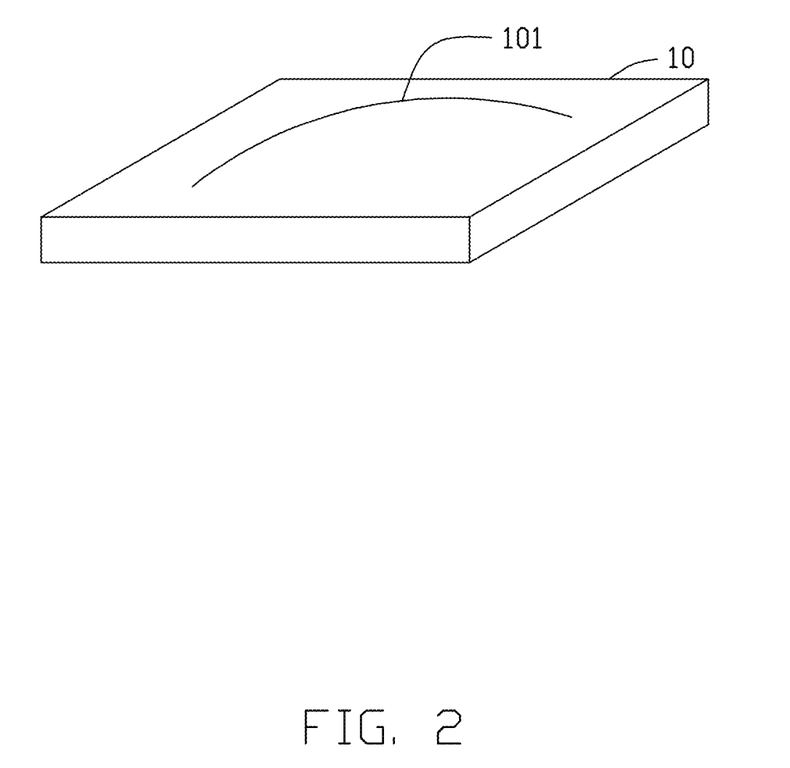
FIG. 2 is an isometric view of a first embodiment of a polarizing layer of the polarizer of FIG. 1.

The polarizing layer 10 is made of a polyvinyl alcohol (PVA) film doped with iodine molecules or dye molecules. The polarizing layer 10 may be made by applying dichroic materials, such as iodine molecules or dye molecules, for absorption on the PVA film by dying, and stretching the dyed PVA film from both sides to align the PVA chains in one direction and arrange the dichroic materials in order. In the embodiment, as shown in FIG. 2, a curved absorption axis 101 is formed by stretching. In the embodiment, curved absorption axes 101 of the polarizing layer 10 may refer to a plurality of absorption axes 101 in different locations of the polarizing layer 10, all having a same bending direction and a same curvature. In other embodiments, the curved absorption axes 101 of the polarizing layer 10 may refer to the absorption axes 101 in different locations of the polarizing layer 10 having a same bending direction and different curvatures.

Figure 3:
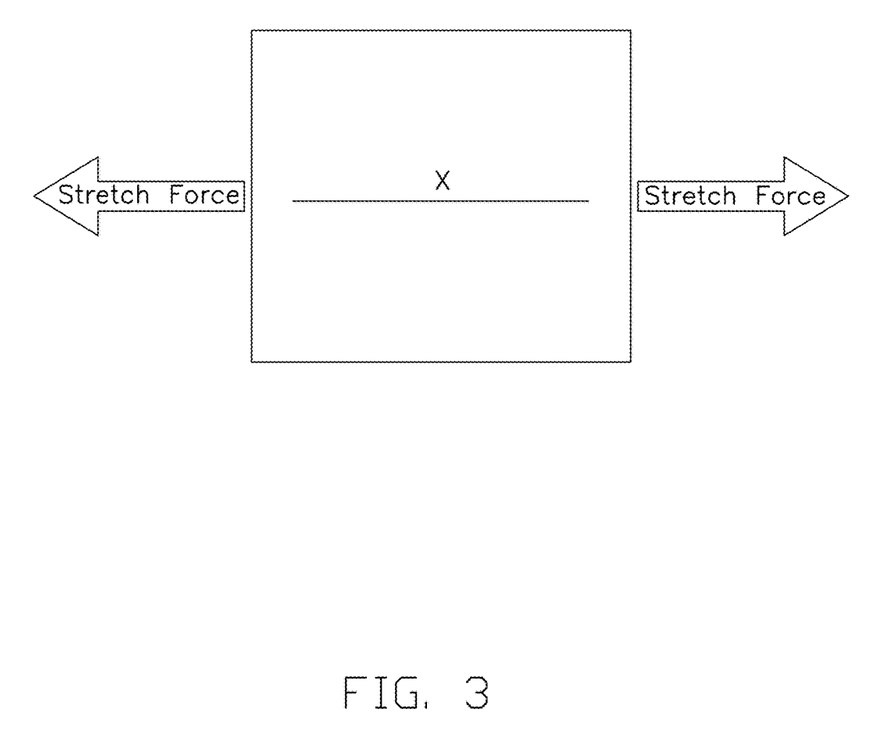
FIG. 3 is a schematic view showing a polarizing layer being stretched by a force according to the prior art.
Figure 4:
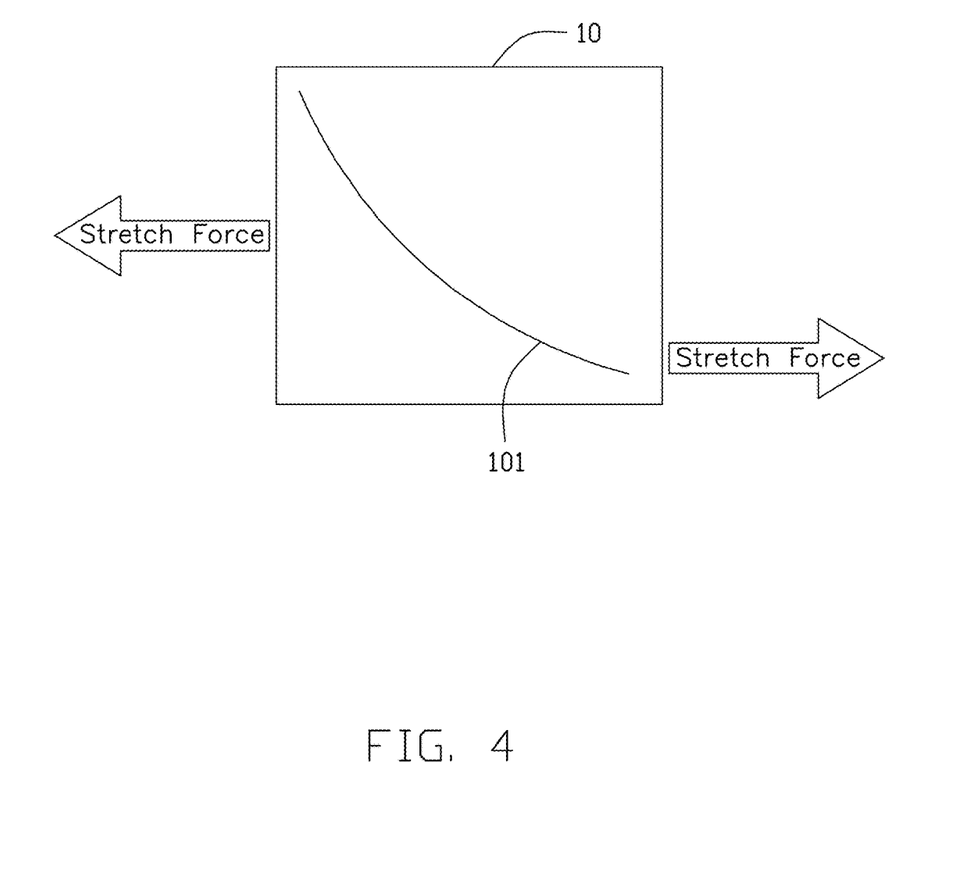
FIG. 4 is a schematic view showing a polarizing layer being stretched by a force according to the disclosure.

Referring to FIG. 3, in a conventional manufacturing process of the polarizing layer 10, two symmetrical forces that are equal to each other and on the same longitudinal axis are applied to the opposite sides of PVA film to stretch the PVA film so that a linear absorption axis X of the PVA film is formed. Referring to FIG. 4, in a manufacturing process of the polarizing layer 10 according to one embodiment of the this disclosure, two asymmetrical forces that are not on the same longitudinal axis are applied to the opposite sides of PVA film to stretch the PVA film so that a curved absorption axis 101 of the polarizing layer 10 is formed. In one embodiment, the absorption axis has a curvature of 1 degree. It will be understood that the absorption axis in FIG. 2 only shows its curved state and does not represent its actual curvature. In addition, the bending direction of the absorption axis 101 is not particularly limited, and it can be modified and designed in accordance with deviations that require compensation.

The first protecting layer 11 and the second protecting layer 12, the adhesive layer 13, and the release film 14 may be made of conventional materials. For example, both the first protecting layer 11 and the second protecting layer 12 may be made of cellulose triacetate that has excellent supportability, optical uniformity, high transparency, acid and alkali resistance, and ultraviolet light resistance. On one hand, both the first protecting layer 11 and the second protecting layer 12 serve as a supporter for the PVA film to ensure that the stretched PVA film does not shrink. On the other hand, the PVA film is protected from moisture, ultraviolet rays and other external contaminants to ensure environmental resistance of the polarizer 100.

The adhesive layer 13 is configured to bond the polarizer 100 to a display panel (not shown) after the release film 14 is removed. The adhesive layer 13 determines the adhesive performance and processing performance of the polarizer 100. The adhesive layer 13 may be a pressure sensitive adhesive.

The release film 14 is configured to protect the adhesive layer 13 from being damaged before the polarizer 100 is bonded to a display panel. The release film 14 may be a silicon-coating on a single side of the PET (polyethylene terephthalate) film. When the polarizer 100 is attached to the display panel, the release film 14 is peeled off.

The protective layer 15 is configured to protect the polarizer 100 from external shocks and scratches.

It can be understood that the polarizer 100 may further include a commonly used optical films such as a reflective film, a compensation film, and the like.

The absorption axis 101 of the polarizing layer 10 is curved, therefore a deviation between the absorption axis direction and an alignment direction (e.g. the absorption axis of the upper polarizer and the upper alignment direction and the absorption axis of the lower polarizer and the bottom alignment direction) can be compensated, thereby reducing light leakage, increasing the color contrast, and improving the performance of a LCD device. Additionally, good displaying images can be watched even when watching the LCD device having the polarizer 100 by wearing sunglasses.

Second Embodiment

Figure 5:
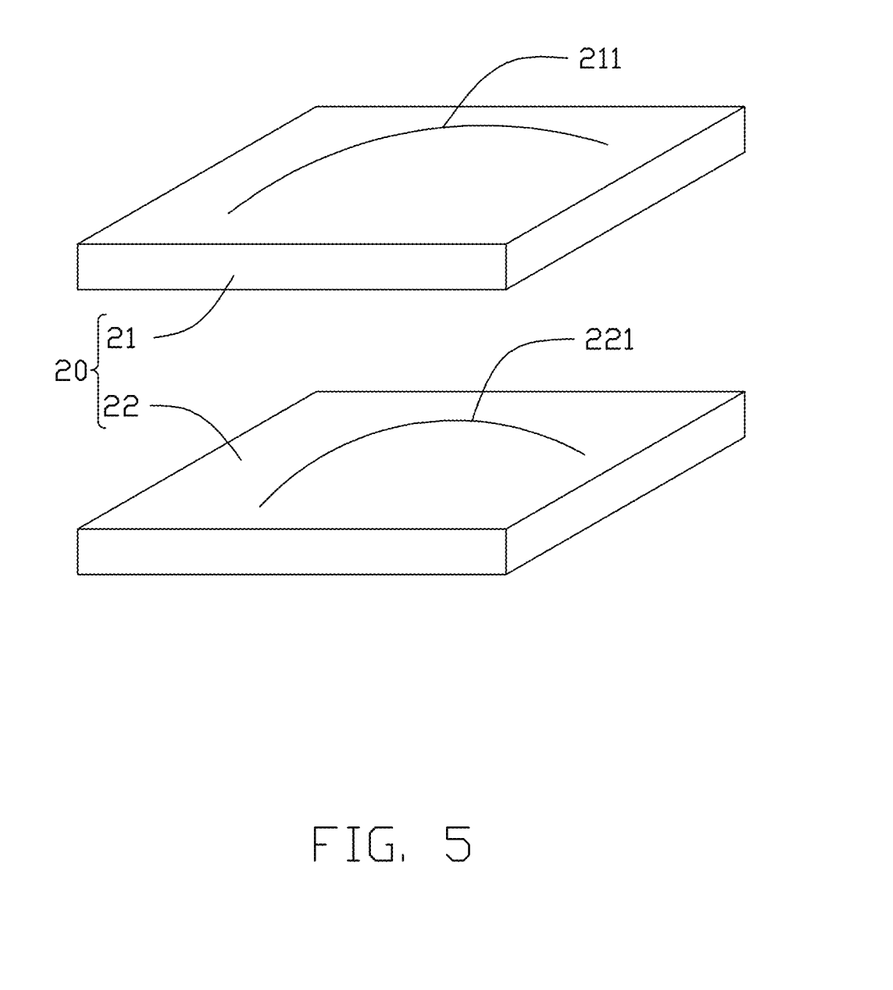
FIG. 5 is an exploded view of a second embodiment of a polarizing layer.

FIG. 5 illustrates a polarizing layer 20 according to a second embodiment. The polarizing layer 20 can be applied in the polarizer 100 to substitute the polarizing layer 10. The polarizing layer 20 is double-layered and includes a first polarizing layer 21 and a second polarizing layer 22 stacked on the first polarizing layer 21. The first polarizing layer 21 may be located on a side of the second protecting layer 12 away from the protective layer 15; and the second polarizing layer 22 may be located on a side of first protecting layer 11 away from the adhesive layer 13. The first polarizing layer 21 has a first curved absorption axis 211. The second polarizing layer 22 has a second curved absorption axis 221. The first absorption axis 211 and the second absorption axis 221 are curved in a same bending direction but have different curvatures. In the embodiment, the first absorption axis 211 has a curvature of 1, and the second absorption axis 221 has a curvature of 2.

In the second embodiment, two polarizing layers having absorption axes of different curvatures but in a same bending direction are stacked. The combination of the two curved light absorption axes compensates for any deviation between the absorption axis direction and an alignment direction, thereby reducing light leakage, increasing the color contrast, and improving the performance of an LCD device.

Third Embodiment

Figure 6:
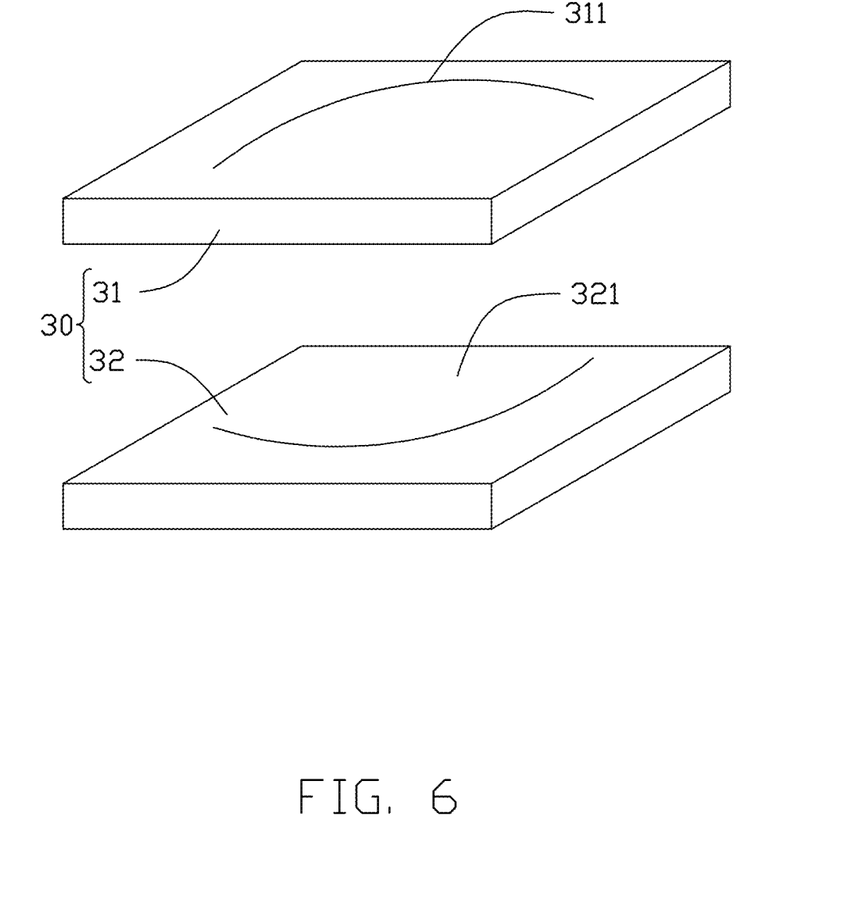
FIG. 6 is an exploded view of a third embodiment of a polarizing layer.

FIG. 6 illustrates a polarizing layer 30 according to a third embodiment. The polarizing layer 30 can be applied in the polarizer 100 to substitute the polarizing layer 10. The polarizing layer 30 is double-layered and includes a first polarizing layer 31 and a second polarizing layer 32 stacked on the first polarizing layer 31. The first polarizing layer 31 has a first curved absorption axis 311. The second polarizing layer 32 has a second curved absorption axis 321. The first absorption axis 311 has a bending direction opposite to a bending direction of the second absorption axis 321. The first absorption axis 311 and the second absorption axis 321 have a same degree of curvature. In the embodiment, the first absorption axis 311 has a curvature of 1, and the second absorption axis 321 has a curvature of −1. The positive and negative curvatures are only used to indicate that the bending directions are the same or different. In other embodiments, the first absorption axis 311 and the second absorption axis 321 may have different bending directions, but the curvatures are different, that is, the absolute values of the curvatures are not equal.

The polarizer 100 using above-described the polarizing layer 10, the polarizing layer 20, or the polarizing layer 30 may be configured as an independent upper polarizer or an independent lower polarizer. Alternatively, polarizer 100 can be combined with yet other polarizers, such as the polarizer having a straight absorption axis.

Fourth Embodiment

Figure 7:
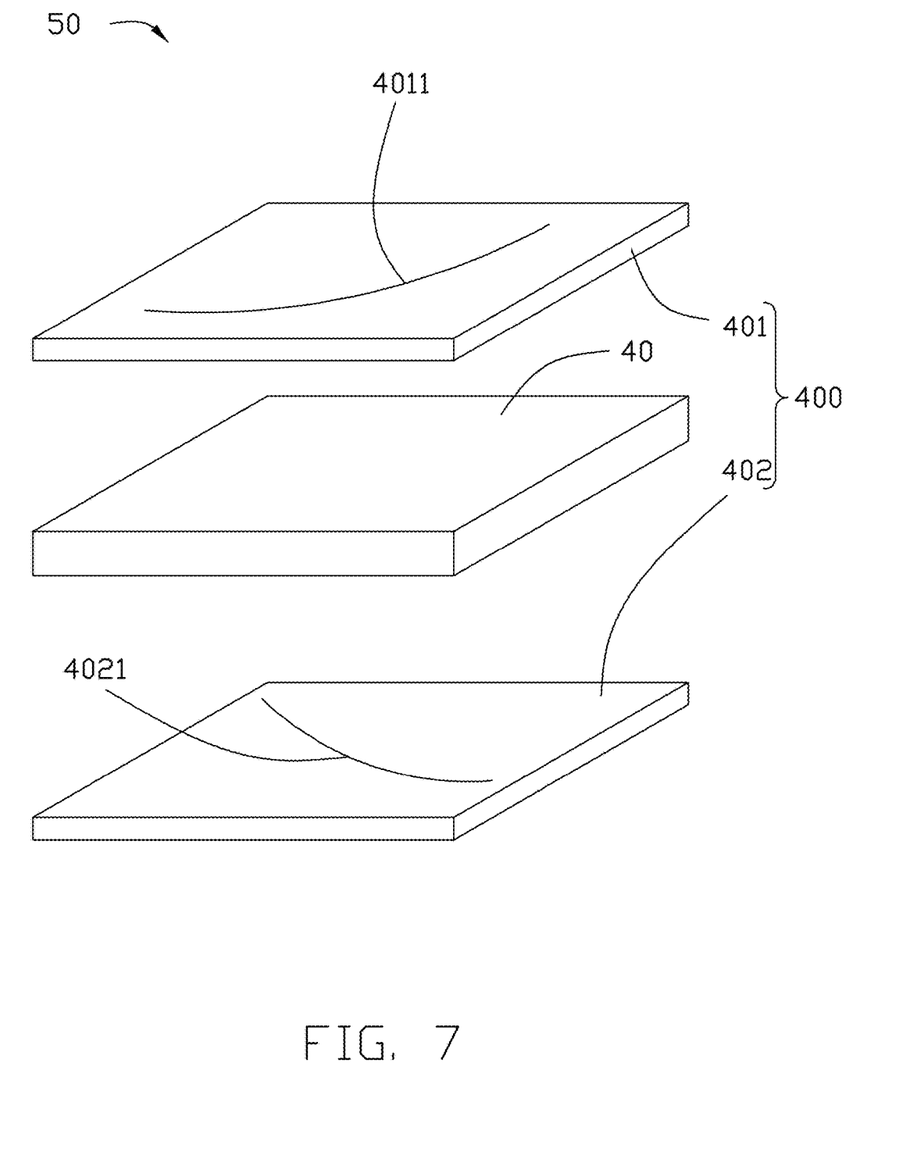
FIG. 7 is an exploded view of an LCD device having a polarizing group according to a fourth embodiment.

FIG. 7 illustrates a polarizing group 400 that can be used in a display device 50. The display device 50 includes a display panel 40 and the polarizing group 400. As shown in FIG. 7, the polarizing group 400 includes a first polarizer 401 and a second polarizer 402. First polarizer 401 acts as an upper polarizer and second polarizer 402 acts as a lower polarizer in the display device 50. The first polarizer 401 and the second polarizer 402 are located on opposite sides of the display panel 40. The structures of the first polarizer 401 and the second polarizer 402 of this embodiment are the same as those of the polarizer 100 of the first embodiment. The first polarizer 401 includes a first polarizing layer (not shown), the first polarizing layer has a curved first absorption axis 4011. The second polarizer 402 includes a second polarizing layer (not shown), and the second polarizing layer has a curved second absorption axis 4021. The first absorption axis 4011 intersects with the second absorption axis 4021.

Fifth Embodiment

Figure 8:
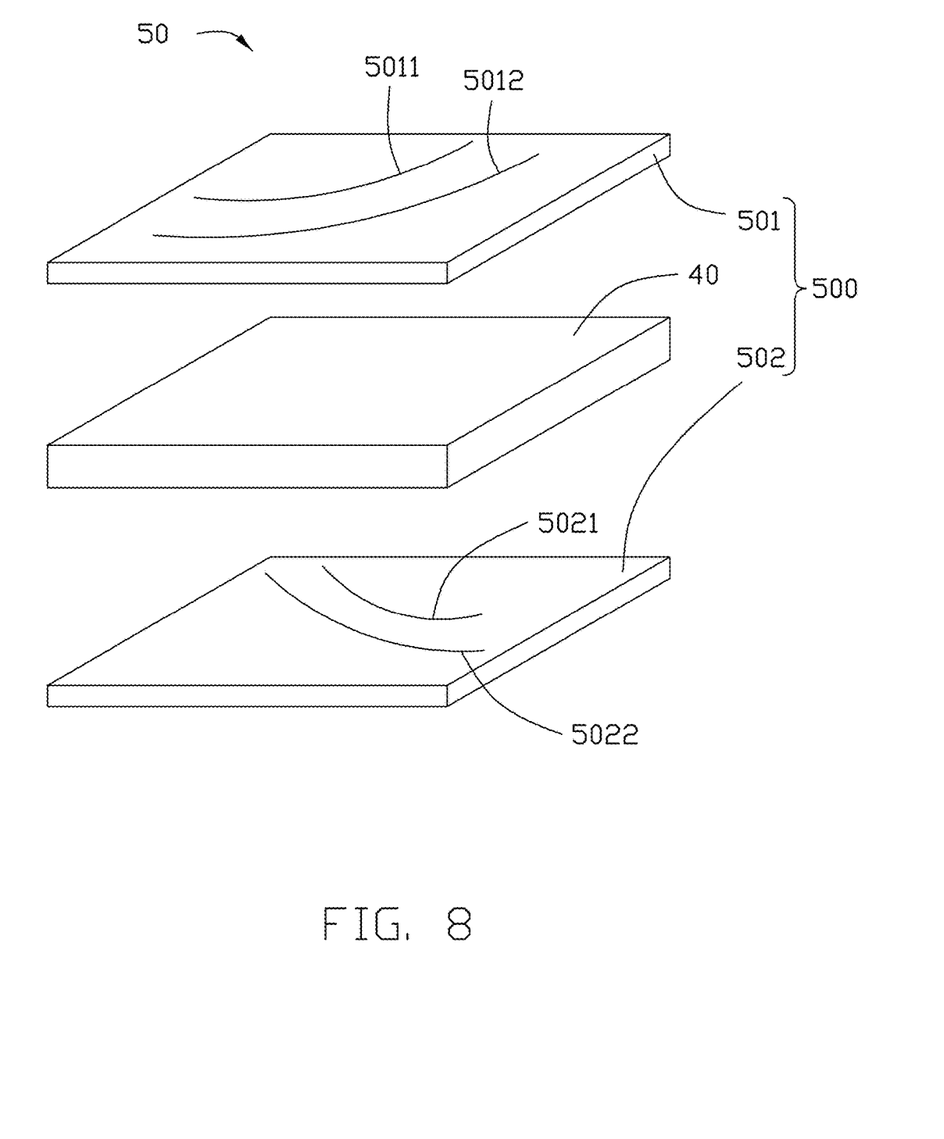
FIG. 8 is an exploded view of an LCD device having a polarizing group according to a fifth embodiment.

FIG. 8 illustrates a polarizing group 500 that can be used in a display device 50. The display device 50 includes a display panel 40 and the polarizing group 500. As shown in FIG. 8, the polarizing group 500 includes a first polarizer 501 and a second polarizer 502. The first polarizer 501 acts as an upper polarizer and the second polarizer 502 acts as a lower polarizer in the display device 50. The first polarizer 401 and the second polarizer 402 are on opposite sides of the display panel 40. Both the first polarizer 501 and the second polarizer 502 include a double-layered polarizing layer that has a same structure as the polarizing layer 20 of the second embodiment. The first polarizer 501 includes a first absorption axis 5011 and a second absorption axis 5012. The second polarizer 502 includes a third absorption axis 5021 and a fourth absorption axis 5022. The first absorption axis 5011 and the second absorption axis 5012 intersect with the third absorption axis 5021 and the fourth absorption axis 5022. In this embodiment, the first absorption axis 5011 and the second absorption axis 5012 have a same bending direction but different curvatures, and the third absorption axis 5021 and the fourth absorption axis 5022 have a same bending direction but different curvatures. In other embodiments, the first absorption axis 5011 and the second absorption axis 5012 may have one bending direction and the third absorption axis 5021 and the fourth absorption axis 5022 may have a different bending direction.

Table 1 shows contrast ratios of IPS type LCD devices using the polarizing groups of the disclosure and a comparative example 1 of an IPS type LCD device using a conventional polarizing group.

TABLE 1

| Display device Number | Center Contrast Ratio |
|---|---|
| comparative example 1 | 855.1 |
| Example 1 | 888.8 |
| Example 2 | 878.2 |
| Example 3 | 942.2 |

The display device of comparative example 1 includes an upper polarizer having a straight absorption axis and a lower polarizer having a straight absorption axis. The display device of example 1 includes an upper polarizer having a curved absorption axis that has a curvature of 2 and a lower polarizer having a straight absorption axis. The display device of example 2 includes a lower polarizer having a curved absorption axis that has a curvature of 2 and an upper polarizer having a straight absorption axis. The display device of example 3 includes an upper polarizer having a curved absorption axis that has a curvature of 2 and a lower polarizer having a curved absorption axis that has a curvature of 2.

It can be seen from Table 1 that the display devices of example 1 and 2 have greater contrast ratios than that of the display pane of comparative example 1; the display device of example 3 has a greater contrast ratio than that of the display devices of example 1 and 2.

Table 2 shows contrast ratios of TN type LCD devices using the polarizing groups of the disclosure and a comparative example 2 of a TN type LCD device using a conventional polarizing group.

TABLE 2

| Display device Number | Center Contrast Ratio |
|---|---|
| comparative example 2 | 738 |
| Example 4 | 814 |
| Example 5 | 799 |
| Example 6 | 856 |

The display device of comparative example 2 includes an upper polarizer having a straight absorption axis and a lower polarizer having a straight absorption axis. The display device of example 4 includes an upper polarizer having a curved absorption axis that has a curvature of 2 and a lower polarizer having a straight absorption axis. The display device of example 5 includes a lower polarizer having a curved absorption axis that has a curvature of 2 and an upper polarizer having a straight absorption axis. The display device of example 6 includes an upper polarizer having a curved absorption axis that has a curvature of 2 and a lower polarizer having a curved absorption axis that has a curvature of 2.

It can be seen from Table 2 that the display devices of example 4 and 5 have greater contrast ratios than that of the display pane of comparative example 2; the display device of example 6 has a greater contrast ratio than that of the display devices of example 4 and 5.

It can also be seen from Table 1 and Table 2 that the center contrast ratio can be increased by 10% or more by using a polarizing group having curved absorption axes in the display device.

Figure 9:
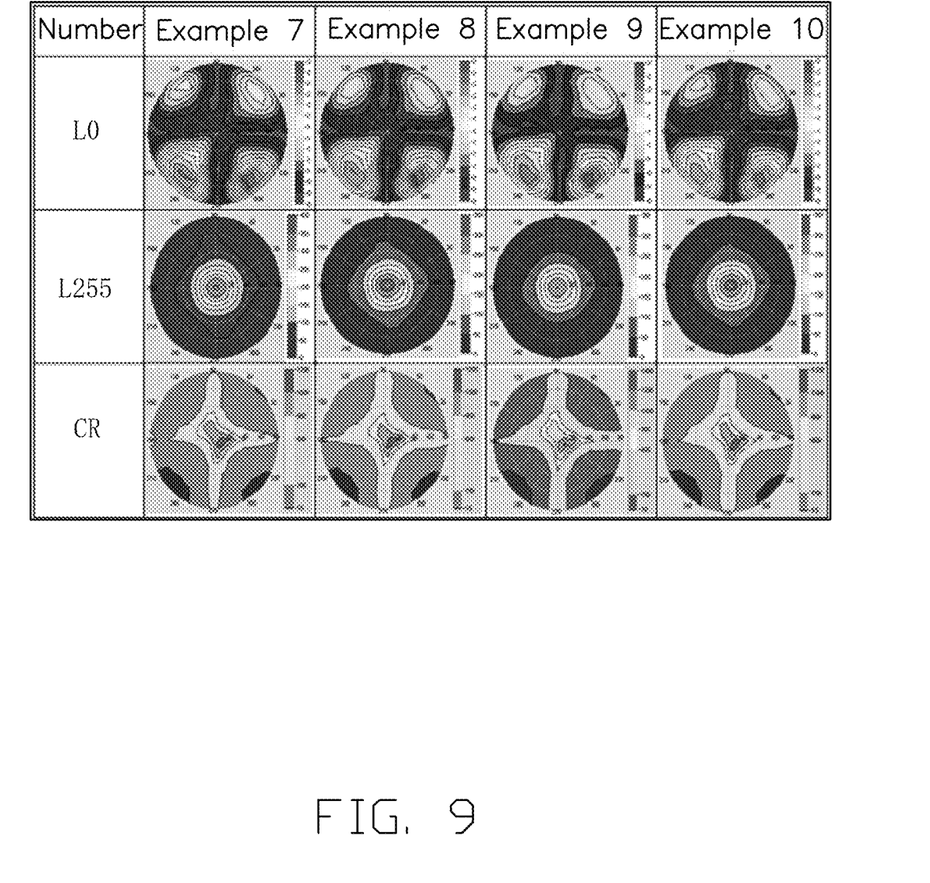
FIG. 9 is a comparison of viewing angles and contrast ratios of a display device with different polarizers.

FIG. 9 shows display conditions of a display device using different polarizing groups in the gray level of 0 and 255. The display device of example 7 includes an upper polarizer and a lower polarizer both having a single-layered polarizing layer having a curved absorption axis. The display device of example 8 includes an upper polarizer having a single-layered polarizing layer having a curved absorption axis and a lower polarizer having double-layered polarizing layers having curved absorption axes. The display device of example 9 includes a lower polarizer having a single-layered polarizing layer that has a curved absorption axis and an upper polarizer having double-layered polarizing layers that have curved absorption axes. The display device of example 10 includes an upper polarizer and a lower polarizer both having double-layered polarizing layers that have curved absorption axes. As can be seen from FIG. 9, the display device of example 10 has an optimal display effect.

It is to be understood, even though information and advantages of the embodiments have been set forth in the foregoing description, together with details of the structures and functions of the embodiments, the disclosure is illustrative only. Changes may be made in detail, especially in matters of shape, size, and arrangement of parts within the principles of the embodiments to the full extent indicated by the plain meaning of the terms in which the appended claims are expressed.

What is claimed is:

1. A polarizer comprising:
a first polarizing layer configured for polarizing light, the first polarizing layer having a first absorption axis; and
a second polarizing layer stacked on and in direct contact with the first polarizing layer, the second polarizing layer having a second absorption axis;
wherein the first absorption axis is a curved line; and the second absorption axis is a curved line.

2. The polarizer of claim 1, wherein the first absorption axis and the second absorption axis have a same bending direction.

3. The polarizer of claim 1, wherein the first absorption axis has a bending direction that is opposite to a bending direction of the second absorption axis.

4. The polarizer of claim 1, wherein the first absorption axis and the second absorption axis have a same curvature.

5. The polarizer of claim 1, wherein the first absorption axis and the second absorption axis have different curvatures.

6. An LCD device, comprising:
a display panel having a first and a second opposite sides;
a upper polarizer on the first side of the display panel; and
a lower polarizer on the second side of the display panel, opposite to the upper polarizer;
wherein the upper polarizer comprises a first polarizing layer and a second polarizing layer stacked on and in direct contact with the first polarizing layer; the first polarizing layer has a first absorption axis; the first absorption axis is a curved line; the second polarizing layer has a second absorption axis, the second absorption axis is a curved line.

7. The LCD device of claim 6, wherein the first absorption axis and the second absorption axis have a same bending direction.

8. The LCD device of claim 6, wherein the first absorption axis has a bending direction that is opposite to a bending direction of the second absorption axis.

9. The LCD device of claim 6, wherein the first absorption axis and the second absorption axis have a same curvature.

10. The LCD device of claim 6, wherein the first absorption axis and the second absorption axis have different curvatures.

\* \* \* \* \*